(12) United States Patent
Gordon et al.

(10) Patent No.: US 9,834,224 B2
(45) Date of Patent: Dec. 5, 2017

(54) CONTROLLING DRIVING MODES OF SELF-DRIVING VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 16 days.

(21) Appl. No.: 14/883,708

(22) Filed: Oct. 15, 2015

(65) Prior Publication Data

US 2017/0106876 A1    Apr. 20, 2017

(51) Int. Cl.
*G01C 22/00* (2006.01)
*G05D 1/00* (2006.01)
*B60W 50/08* (2012.01)
*B60W 50/00* (2006.01)

(52) U.S. Cl.
CPC ......... *B60W 50/082* (2013.01); *G05D 1/0061* (2013.01); *B60W 2050/0071* (2013.01); *B60W 2600/00* (2013.01); *G05D 2201/0213* (2013.01)

(58) Field of Classification Search
CPC ....... B60W 50/082; B60W 2050/0071; B60W 2600/00; G05D 1/0061; G05D 2201/0213

USPC .......................................................... 701/23
See application file for complete search history.

(56) References Cited

U.S. PATENT DOCUMENTS

| 4,665,395 A | 5/1987 | Van Ness |
| 4,908,988 A | 3/1990 | Yamamura et al. |
| 5,975,791 A | 11/1999 | McCulloch |
| 6,064,970 A | 5/2000 | McMillian et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |

(Continued)

FOREIGN PATENT DOCUMENTS

| CN | 1135063 | 11/1996 |
| CN | 2349068 Y | 11/1999 |

(Continued)

OTHER PUBLICATIONS

U.S. Appl. No. 14/855,731 Non-Final Office Action dated Apr. 15, 2016.

(Continued)

*Primary Examiner* — Harry Oh
(74) *Attorney, Agent, or Firm* — Law Office of Jim Boice

(57) ABSTRACT

A processor-implemented method, system, and/or computer program product control a driving mode of a self-driving vehicle (SDV). One or more processors detect that an SDV is being operated in manual mode by a human driver. The processor(s) determine that the human driver is unqualified to operate the SDV in manual mode, and then transfer control of the SDV to an SDV on-board computer in order to place the SDV in autonomous mode.

18 Claims, 7 Drawing Sheets

(56) References Cited

U.S. PATENT DOCUMENTS

| | | |
|---|---|---|
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,190,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,509,982 B2 | 8/2013 | Montemerlo et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,793,046 B2 | 7/2014 | Lombrozo et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,924,150 B2 | 12/2014 | Tsimhoni et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,286,520 B1 | 3/2016 | Lo et al. |
| 9,305,411 B2 | 4/2016 | Ricci |
| 9,317,033 B2 | 4/2016 | Ibanez-Guzman et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,628,975 B1* | 4/2017 | Watkins .............. H04W 4/22 |
| 9,646,496 B1* | 5/2017 | Miller .............. G08G 1/07 |
| 2002/0026841 A1 | 3/2002 | Svendsen .......... F16H 59/0204 74/335 |
| 2003/0065572 A1 | 4/2003 | McNee et al. |
| 2003/0076981 A1 | 4/2003 | Smith et al. |
| 2004/0078133 A1 | 4/2004 | Miller |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0163939 A1* | 7/2006 | Kuramochi .......... B60T 8/885 303/122.04 |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1* | 5/2007 | Betzitza .............. B60W 40/02 701/1 |
| 2008/0048850 A1 | 2/2008 | Yamada |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2009/0094109 A1 | 4/2009 | Aaronson et al. |
| 2009/0248231 A1 | 10/2009 | Kamiya |
| 2009/0313096 A1 | 12/2009 | Kaga |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0035250 A1 | 2/2011 | Finucan |
| 2011/0077807 A1* | 3/2011 | Hyde ................ G06Q 30/02 701/22 |
| 2011/0137699 A1 | 6/2011 | Ben-Ari et al. |
| 2011/0264521 A1 | 10/2011 | Straka |
| 2012/0072243 A1* | 3/2012 | Collins .............. G06Q 40/08 705/4 |
| 2012/0139756 A1 | 6/2012 | Djurkovic |
| 2012/0277947 A1 | 11/2012 | Boehringer et al. |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0092332 A1* | 4/2014 | Price .................. B60R 1/001 349/16 |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1* | 3/2015 | Fleury ................ B60J 3/04 349/14 |
| 2015/0066282 A1* | 3/2015 | Yopp ................ G05D 1/0061 701/24 |
| 2015/0066284 A1 | 3/2015 | Yopp |
| 2015/0070178 A1 | 3/2015 | Kline |
| 2015/0095190 A1 | 4/2015 | Hammad et al. |
| 2015/0120331 A1* | 4/2015 | Russo ................ G06Q 40/08 705/4 |
| 2015/0134178 A1 | 5/2015 | Minoiu-Enache |
| 2015/0141043 A1 | 5/2015 | Abramson |
| 2015/0149021 A1* | 5/2015 | Duncan ................ A61B 5/18 701/23 |

(56) References Cited

U.S. PATENT DOCUMENTS

| | | | |
|---|---|---|---|
| 2015/0160019 A1* | 6/2015 | Biswal | G01C 21/26 701/1 |
| 2015/0166059 A1 | 6/2015 | Ko | |
| 2015/0175070 A1 | 6/2015 | Attard et al. | |
| 2015/0178998 A1 | 6/2015 | Attard et al. | |
| 2015/0196256 A1 | 7/2015 | Venkatraman et al. | |
| 2015/0232065 A1 | 8/2015 | Ricci et al. | |
| 2015/0293994 A1 | 10/2015 | Kelly | |
| 2015/0338226 A1 | 11/2015 | Mason et al. | |
| 2015/0339639 A1 | 11/2015 | Choe | |
| 2016/0001781 A1 | 1/2016 | Fung et al. | |
| 2016/0026182 A1 | 1/2016 | Boroditsky et al. | |
| 2016/0075512 A1 | 3/2016 | Lert, Jr. | |
| 2016/0078695 A1 | 3/2016 | McClintic et al. | |
| 2016/0078758 A1 | 3/2016 | Basalamah | |
| 2016/0090100 A1* | 3/2016 | Oyama | B60W 50/0225 701/23 |
| 2016/0139594 A1 | 5/2016 | Okumura et al. | |
| 2016/0140507 A1 | 5/2016 | Stevens et al. | |
| 2016/0176409 A1 | 6/2016 | Kirsch et al. | |
| 2016/0303969 A1 | 10/2016 | Akula | |
| 2016/0334797 A1 | 11/2016 | Ross et al. | |
| 2016/0344737 A1 | 11/2016 | Anton | |
| 2016/0355192 A1* | 12/2016 | James | B60W 50/082 |
| 2016/0364823 A1 | 12/2016 | Cao | |
| 2017/0010613 A1 | 1/2017 | Fukumoto | |
| 2017/0021830 A1 | 1/2017 | Feldman et al. | |
| 2017/0129487 A1 | 5/2017 | Wulf | |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

U.S. Appl. No. 14/887,388, filed Oct. 20, 2015.
A. Abkowitz, "Do Self-Driving Cars Spell Doom for Auto Insurers?", Bloomberg L.P., Sep. 10, 2014, pp. 1-2.
Anonymous, "Self-Driving Cars and Insurance", Insurance Information Institute, Inc., Feb. 2015, pp. 1-3.
Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.
Smith, Mark. "Inovations: Emerging Trends in the Wheelchair Market." New Mobility Magazine, Aug. 1, 2014. Web. <http://www.newmobility.com/2014/08/emerging-trends/>.
Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.
Anonymous, 'System and Method to Target Advertisements for the Right Focus Group'. IP.com, No. 000218285, May 31, 2012, pp. 1-2.
Anonymous, "Car Built-In Mechanism to Enforce Mandatory Self-Driving Mode", IP.com, No. 000234916, Feb. 14, 2014, pp. 1-3.
T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
E. Lehrer, "The Insurance Implications of Google's Self-Driving Car", Insurance Journal, Right Street Bloh=G, May 28, 2014, pp. 1-2.
Chen S, et al., A Crash Risk Assessment Model for Roas Curves. Inproceedings 20th International Technical Conference on the Enhanced Saftey of Vehicles., 2007. Lyon, France.
T. Vanderbilt, "Let the Robot Drive: The Autonomous Car of the Future is Here", Wired Magazine, Conde Nast, www.wired.com, Jan. 20, 2012. pp. 1-34.
J. Farrier, "Airlines Infuse Their Planes With Smells to Calm You Down", Neatorama, neatorama.com, Mar. 29, 2015, 1 page.
Anonymous, "Diagnostics Mechanism for Self-Driving Cars to Validate Self-Driving Capabilities", IP.com, Jun. 6, 2014, pp. 1-5. IP.com.
P. Mell et al., "The NIST Definition of Cloud Computing", National Institute of Standards and Technology, Information Technology Laboratory, Sep. 2011, pp. 1-7.
X. Jardin, "Terrifying dashcam video captures distracted teen drivers crashing while goofing off", Boing Boing, www.boingboing.net, Mar. 26, 2015, 1 page.
M. Fox, "Self-driving cars safer than those driven by humans: Bob Lutz", CNBC, www.cnbc.com, Sep. 8, 2014, 1 page.
J. Miller, "Self-Driving Car Technology's Benefits, Potential Risks, and Solutions", The Energy Collective, theenergycollective.com, Aug. 19, 2014, pp. 1-7.
J. O'Callaghan, "Inside the Mercedes Self-Guiding Ca That's Built for Luxurious Living In, Not Driving", Associated Newspapers Ltd., Daily Mail, dailymail.co.uk, Jan. 6, 2015, pp. 1-13.
J. Wei et al., "Towards a Viable Autonomous Driving Research Platform", IEEE, Intelligent Vehicles Symposium (IV), 2013, pp. 1-8.
Brownell, "Shared Autonomous Taxi Networks: An Analysis of Transportation Demand in NJ and a 21st Century Solution for Congestion", Dissertation, Princeton University, 2013, pp. 1-122.
Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.
Lutin et al., "The Revolutionary Development of Self-Driving Vehicles and Implications for the Transportation Engineering Profession", ITE Journal 83.7, 2013, pp. 28-32.
A. Hars, "Self-Driving Cars: The Digital Transformation of Mobility", Marktplatze Im Umbruch, Springer Berlin Heidelberg, 2015, pp. 539-549.
Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.
Anonymous, "Avoiding Crashes With Self-Driving Cars: Today's Crash-Avoidance Systems are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.
C. Berger et al., "Cots-Architecture With a Real-Time OS for a Self-Driving Miniature Vehicle", SAFECOMP 2013—Workshop Ascoms of the 32nd International Conference on Computer Safety, Reliability and Security, Sep. 2013, Toulouse, France, pp. 1-13.

\* cited by examiner

CONTROLLING DRIVING MODES OF SELF-DRIVING VEHICLES

BACKGROUND

The present disclosure relates to the field of vehicles, and specifically to the field of self-driving vehicles. Still more specifically, the present disclosure relates to the field of controlling whether self-driving vehicles operate in autonomous mode or manual mode.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A processor-implemented method, system, and/or computer program product control a driving mode of a self-driving vehicle (SDV). One or more processors detect that an SDV is being operated in manual mode by a human driver. The processor(s) determine that the human driver is unqualified to operate the SDV in manual mode, and then transfer control of the SDV to an SDV on-board computer in order to place the SDV in autonomous mode.

DETAILED DESCRIPTION

Figure 1:
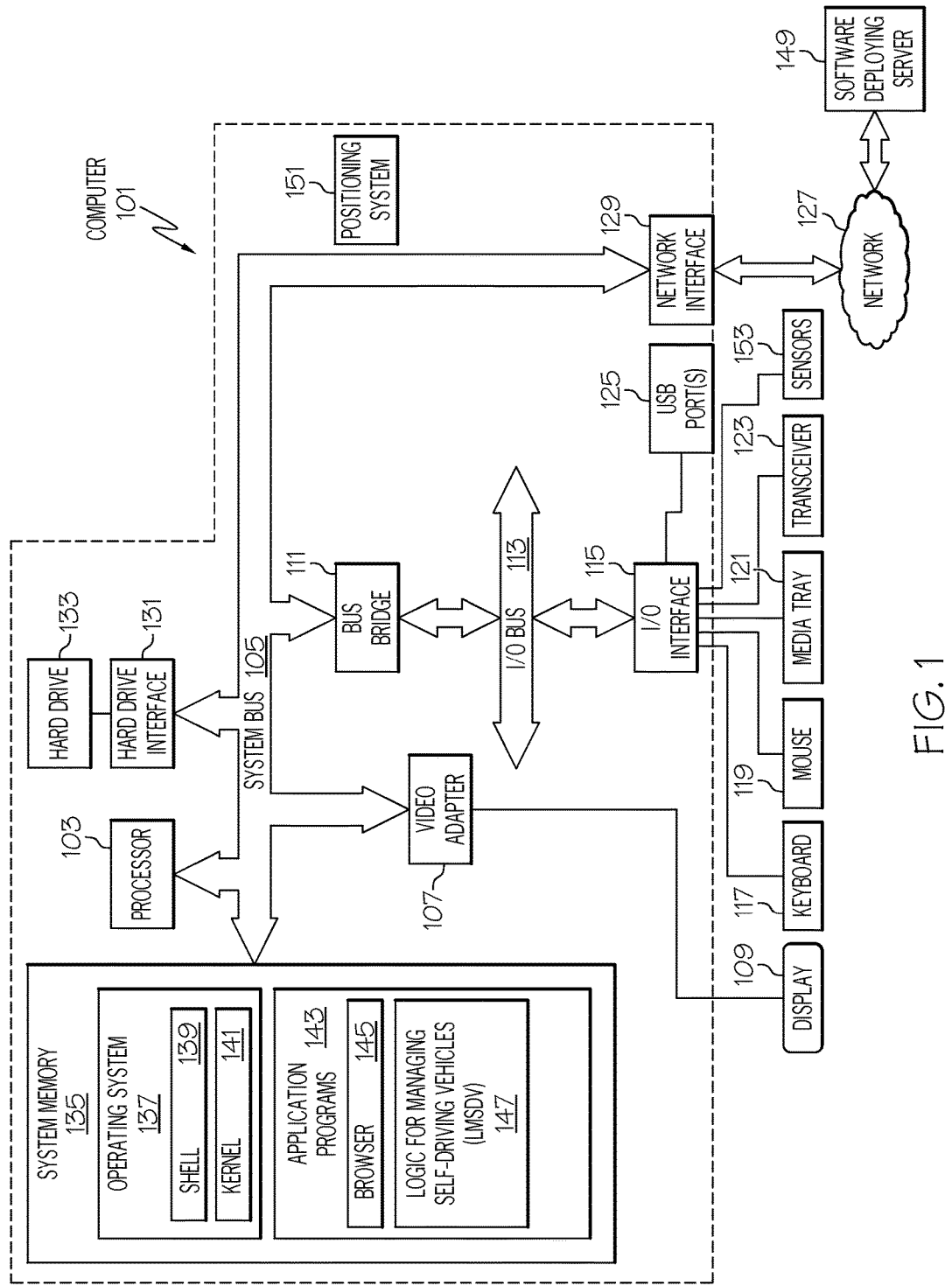
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Described herein is a system and method for automatically having a self-driving vehicle (SDV) enter and leave the self-driving mode (i.e., switch between autonomous mode in which the SDV drives itself and manual mode in which the SDV is driven by a human driver) based on any of: a sensing of possible driver impairment, a cognitive state of the driver (including confusion, agitation, rage, inability to focus attention, seizure, stoke), driver fatigue, an unusual sleep schedule of the driver, the SDV driving towards the sun or another bright object, the driver not using prescription glasses, the driver not using sunglasses, the driver not having a wallet with license, the driver failing to have his/her seatbelt fastened, etc.

In one or more embodiments, the transition from manual mode to autonomous mode is "surreptitious" (i.e., hidden from the driver), such that the SDV has ultimate control over when to go into autonomous mode. Alternatively, manual mode or autonomous modes may be "suggested" to the driver (e.g., if driver becomes overly confused, inattentive, or consumed with rage), such that the SDV may offer to take over control of the SDV in order to protect the driver, passengers, and surrounding drivers and environment.

At a high level view of one or more embodiments of the present invention, a system monitors a driver state (S). If driver state (S) falls below a threshold for that state's effectiveness (S<T), self-driving (autonomous) mode is activated (or suggested). That is, if the human driver is unqualified to operate the SDV, then the SDV will go into autonomous mode.

In one or more embodiments of the present invention, if surreptitious automation mode is activated, then SDV actions are delayed slightly according to a risk of delaying the action and risk of eliminating a driver's perception of control. That is, rather then surprising the driver by suddenly no longer having control of the SDV, the system provides an alert (audible, visual, etc.) regarding the transition to autonomous mode from manual mode, and/or delays the transition in order to give the driver time to (mentally) prepare for the transition.

In one or more embodiments of the present invention, the determination of whether to place the SDV in autonomous or manual mode is determined by sensor readings (e.g., from sensors 153 shown in FIG. 1 or SDV equipment sensors 315 shown in FIG. 3) that describe the current driving style of the driver of the SDV. For example, such sensors may detect that the driver is unduly swerving between lanes, speeding, tailgating, passing without adequate space cushion, been driving too long (e.g., more than 12 hours straight), etc. Upon such detection, the SDV on-board computer 301 will automatically take control of the SDV, thus switching from manual mode to autonomous mode.

In one or more embodiments of the present invention, if surreptitious automation mode is activated, driver actions are both operationally and/or cognitively acknowledged by the SDV to the extent they coincide with SDV actions. That is, assume that the SDV is actually in autonomous mode, but has not notified the driver as such. This scenario allows an SDV on-board computer (e.g., SDV on-board computer 301 shown in FIG. 3) in the SDV to act as a "co-pilot" to the driver, such that if the driver is controlling the SDV in a manner deemed to be safe by the SDV on-board computer, then the driver's inputs for controlling the SDV are allowed to go through to the SDV vehicular physical control mechanisms (e.g., SDV vehicular physical control mechanisms 305 shown in FIG. 3). However, if the driver's control inputs are deemed unsafe by the SDV on-board computer 301, then the SDV on-board computer will take control of the SDV away from the driver.

Figure 3:
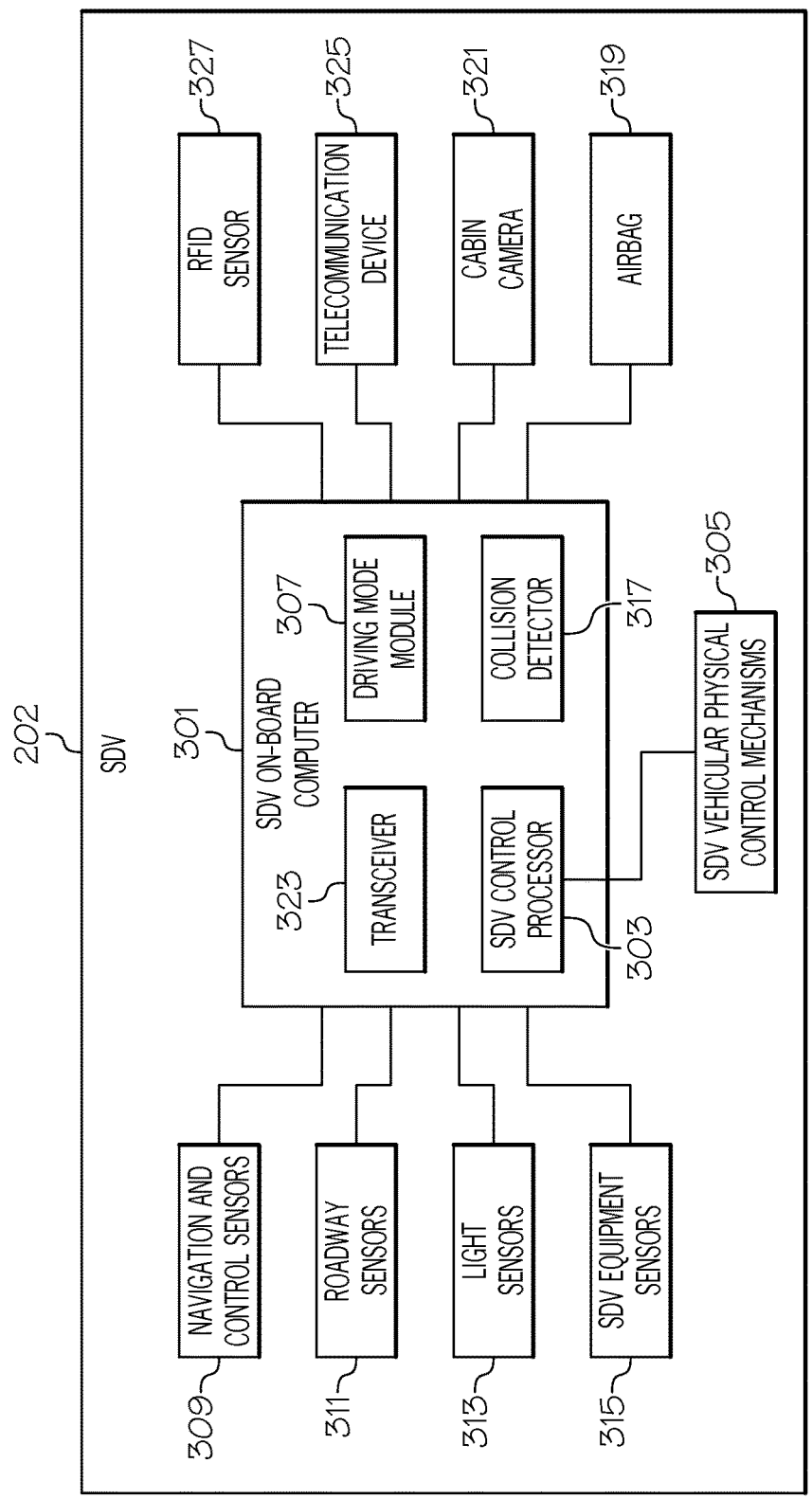
FIG. 3 depicts additional detail of control hardware within an SDV.

In one embodiment of the present invention, if the SDV on-board computer 301 determines (e.g., based on sensors readings from SDV equipment sensor 315 shown in FIG. 3 or an external camera (not shown) mounted on the SDV 202) that the SDV 202 is about to have a collision with another object, the SDV on-board computer 301 will automatically take control of the SDV 202.

In one embodiment of the present invention, if the cognitive and/or physical state of driver becomes dangerously unhealthy (e.g., seizure, stroke, shock), the SDV will automatically contact relevant services (e.g., an ambulance or nearby emergency room) and then either safely drives the car to safe waiting area (including road's shoulder, initiating alert blinkers once there) or to a nearby hospital or clinic. For example, if biometric sensors on a passenger or driver of the SDV reveal that a person is having a heart attack, then the SDV will be placed into autonomous mode (if not already so) and the SDV will be driven to the nearest health care provider known (from a lookup table or other database)

to 1) be able to handle this type of medical emergency and 2) to be open and available to receiving an emergency patient.

In other embodiments of the present invention, the SDV may transition from manual mode to autonomous self-driving mode if it is detected that: a cell-phone is ringing, an audible alert from a cell phone indicates an incoming text message or email, the driver's eyes have drifted from the road for more than a certain amount of time (e.g., 4 seconds), the driver has become unconscious (as measured by the driver not responding to an audio alert or based on biometric sensors associated with the driver), the driver is slumped over the steering wheel, the airbag has deployed, the car has been involved in an accident, the driving difficulty for a beginner has exceeded a threshold (e.g. due to weather, terrain, potholes, traffic, cognitive load, etc.), etc.

Driver state can further be monitored by one or more on-board cameras that capture real-time videos of the driver. The video is analyzed dynamically in real-time to detect if the face of the driver is not looking forward; if the driver is looking down or sideways but not at the road; if the driver is slumped over; if there are abnormal changes of color and expression (such as tongue protruding out due to a stroke) on the face of the driver; if the driver's hand(s) is/are not on the steering wheel; if the driver is not pressing the brakes before a scheduled stop (aided by route information or red lights), etc. Such data can be recorded and stored for historical learning of the driver behavior for that vehicle or for all SDVs that this driver has driven.

In one or more embodiments of the present invention a hybrid environment for "collaborative" driving allows smoother adoption of SDV by general public. That is, SDVs communicate with one another, sharing road conditions, etc. that allow individual SDVs to decide whether to be in manual mode or autonomous mode.

While the autonomous mode is often safer than the manual mode, there are time in which manual mode is preferable. For example and in one embodiment, the SDV will enter manual mode (with suitable strong alerts to the driver) if the SDV determines that a nuanced response is required to a policeman, unusual barriers have been deployed near an accident, etc. That is, if the SDV on-board computer is not certain what a certain human gesture, barricade, animal, etc. is or means, then the SDV on-board computer may defer control of the SDV to the driver.

Many of the steps above have a confidence level associated with them (for example, the SDV determining a driver state or road difficulty, etc.) The confidence level is increased when the driver broadcasts information based on a driver profile, along with optional steering ability analysis, driver estimated distraction analysis, intention predictor, etc.

In one or more embodiments of the present invention, the driver profile provides an indication of the user's physical or other kind of abilities. Furthermore and in one or more embodiments of the present invention, a joint analysis is performed if more than one person is in the car, who may be talking and creating distractions. Similarly, a joint analysis may be performed if a person and a pet are engaged in activity in the car, e.g. the dog is barking. Similarly, the joint analysis may be performed for other distractions within the car, such as those caused by crying children, children fighting or arguing, when the SDV is driving into (facing) the sun, when the SDV is driving on snow or other hazardous conditions, etc.

In one or more embodiments of the present invention, the distraction analysis is performed using cognitive computing, which is performed by a heuristic cognitive logic that is able to evaluate the level of distraction being experienced by the driver at any particular point in time or any particular environment or any particular circumstances.

In one or more embodiments of the present invention, the SDV and a cell phone are part of an Internet of Things (IoT). When the cell phone receives a message/text/phone call that requires the immediate attention of the driver, then the SDV will automatically switch to autonomous mode so the driver can respond to the message/text/phone call.

In one or more embodiments of the present invention, the IoT includes a service messenger system and the SDV-on-board computer. For example, assume that sensors on the SDV detect that air pressure in a tire is low. The service messenger system will receive a message regarding the low air pressure, and will automatically put the SDV into autonomous mode in order to autonomously drive the SDV to the nearest facility that is able to handle the problem.

In another IoT example for the present invention, assume that a weather monitoring station (e.g., that detects precipitation, temperature, darkness, etc.) determines that environmental conditions are such that it would be safer for the SDV to be in autonomous mode rather than manual mode. As such, the weather monitoring station will transmit an instruction to the SDV on-board computer to place the SDV into autonomous mode.

In one or more embodiments of the present invention, the behavior of the other vehicles on the road around the car (further) determines whether or not the SDV is placed into manual or autonomous mode. For example, sensors along the roadway and/or within a first SDV may detect that nearby SDVs are speeding, weaving in and out of traffic, etc. Since the SDV on-board computer is better at handling such conditions, the SDV on-board computer will automatically take over control of the SDV, thus placing the SDV in autonomous mode.

In one embodiment of the present invention, active learning is employed so that the system as a whole learns from the experiences of many SDVs and drivers, in different geographies and among cohorts. Geographies may include cities, rural areas, and the like. Cohorts may include people with certain characteristics, disabilities, etc.

In one or more embodiments of the present invention, a weighted voting system is used to weight the various variables used in making the decision to enter a mode. Such inputs may include: a history of others entering a driving mode in difficult roads, votes by other nearby cars, nearness of pedestrians to the side of the road, other cars stopping nearby to allow pedestrian crossings, etc. Such weighted voting approaches may be characterized primarily by three aspects—the inputs, the weights, and the quota. The inputs are (I1, I2, . . . , IN). N denotes the total number of inputs. A input's weight (w) is the number of "votes" associated with the input. The quota (q) is the minimum number of votes required to "pass a motion," which in this case refers primarily to a decision made by the SDV.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating computer 201 shown in FIG. 2, and/or a self-driving vehicle (SDV) on-board computer 301 shown in FIG. 3, and/or a coordinating server 401 depicted in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202, SDV 204, and/or coordinating server 401 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-5. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
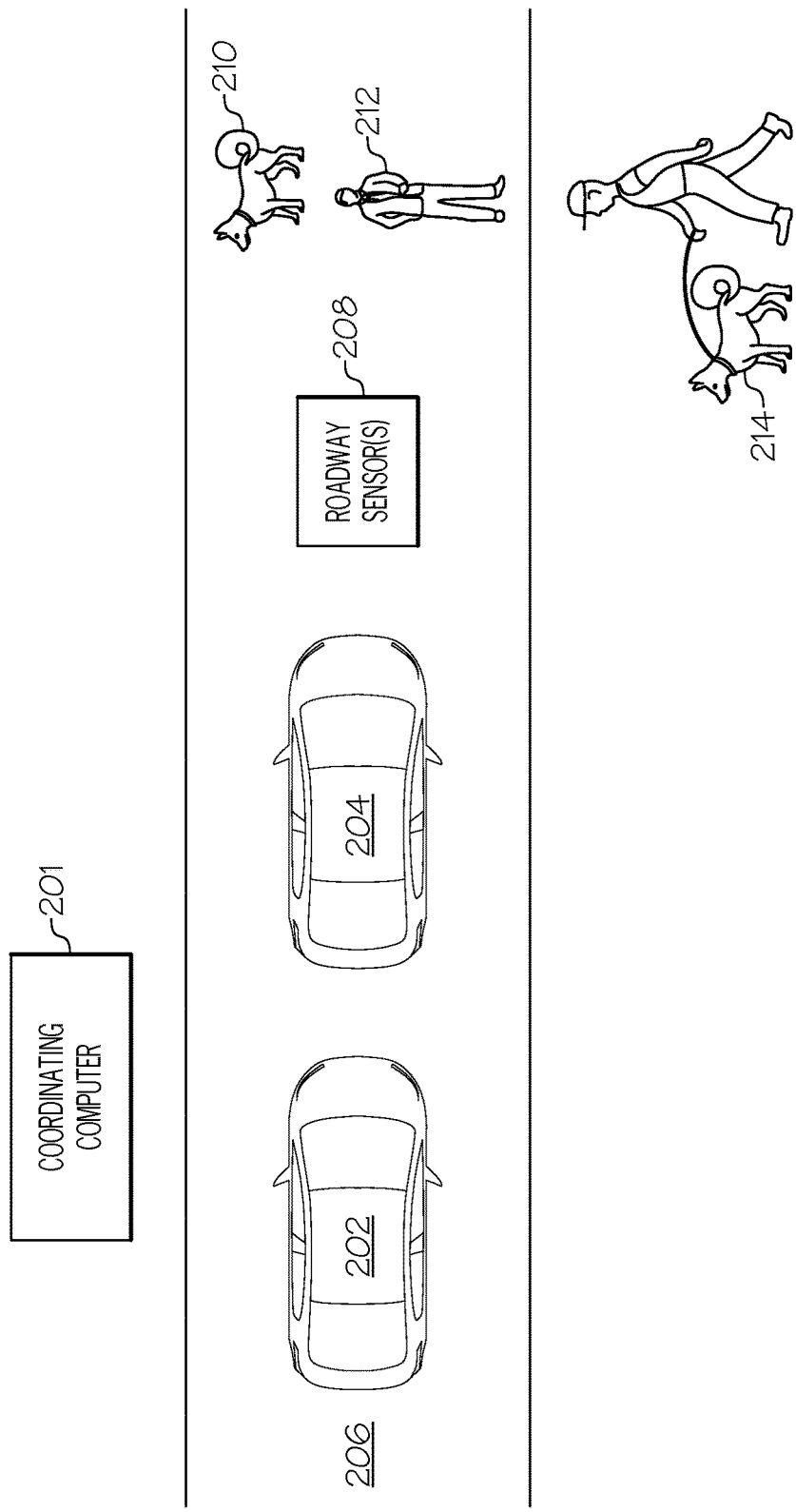
FIG. 2 illustrates an exemplary self-driving vehicle (SDV) traveling on a roadway in accordance with one or more embodiments of the present invention.

With reference now to FIG. 2, an exemplary self-driving vehicle (SDV) 202 and an SDV 204 traveling along a roadway 206 in accordance with one or more embodiments of the present invention is presented. Roadway 206 may be a public roadway, a private roadway, a parking lot, a paved road, an unpaved road, and/or any other surface capable of supporting vehicles, wheeled (e.g., cars), tracked (e.g., trains), or a combination thereof.

Current conditions of the roadway 206, including weather conditions, traffic conditions, construction events, accident events, etc., can be determined and transmitted by a coordinating computer 201. That is, coordinating computer 201 is able to determine current roadway conditions based on internal sensors 153 shown in FIG. 1, and/or roadway sensor(s) 208 (e.g., sensors that are able to detect the number and speed of vehicles traveling on the roadway 206, the amount and/or type of precipitation on the roadway 206, the temperature of the roadway 206 and/or ambient air around the roadway 206, etc.), information received from sensors and/or on-board computers within SDV 202 and/or SDV 204, and/or from information received by an information service (e.g., a weather station).

As shown in FIG. 2, various conditions exist on roadway 206. That is, there may be rain or snow on the roadway 206, as detected by roadway sensor(s) 208. There may be other SDVs (e.g., SDV 204) on the roadway 206 along with SDV 202. There may be an animal 210 or a pedestrian 212 on the roadway 206, and/or there may be an animal and/or person 214 on the side of the roadway 204, which may or may not step onto the roadway 202.

The present invention is directed to determining whether or not a driver of SDV 202 is qualified to negotiate current conditions (including the exemplary conditions shown in FIG. 1) on the roadway 206. If not, then the SDV 202 is switched from manual mode to autonomous mode.

As used and described herein, "manual mode" is defined as an SDV being at least partially under the input control of a human driver. As used and described herein, "autonomous mode" is defined as the SDV being totally controlled by hardware/software logic without inputs from the human driver. That is, if an SDV is being steered by a human driver but has cruise control activated, then it is in manual mode, since the SDV is partially under the input control (steering) of the human driver. However, if steering, braking, throttle control, obstacle/vehicle avoidance, etc. are all under the control of hardware/software logic such as the SDV on-board computer 301 shown in FIG. 3, then the SDV is in autonomous mode.

Thus, additional details of one or more embodiments of the SDV 202 (which may have a same architecture as SDV 204) are presented in FIG. 3. As shown in FIG. 3, SDV 202 has an SDV on-board computer 301 that controls operations of the SDV 202. According to directives from a driving mode module 307, the SDV 202 can be selectively operated in manual mode or autonomous mode. In a preferred embodiment, driving mode module 307 is a dedicated hardware device that selectively directs the SDV on-board computer 301 to operate the SDV 202 in autonomous mode or manual mode.

While in manual mode, SDV 202 operates as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 303 by the driver result in output signals that control the SDV vehicular physical control mechanisms 305 (e.g., the engine throttle, steering mechanisms, braking systems, turn signals, etc.).

While in autonomous mode, SDV 202 operates without the input of a human driver, such that the engine, steering mechanism, braking system, horn, signals, etc. are controlled by the SDV control processor 303, but now under the control of the SDV on-board computer 301. That is, by processing inputs taken from navigation and control sensors 309 and the driving mode module 307 indicating that the SDV 202 is to be controlled autonomously, then driver inputs are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice on the roadway 206 (e.g., using cameras, heat sensors, moisture sensors, thermometers, etc.). Roadway sensors 311 are also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 206 is using light sensors.

In one or more embodiments of the present invention, also within the SDV 202 are SDV equipment sensors 315. Equipment sensors 315 may include cameras aimed at tires on the SDV 202 to detect how much tread is left on the tire. Equipment sensors 315 may include electronic sensors that detect how much padding is left of brake calipers on disk brakes. Equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. Equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within the SDV 202 is a collision detector 317, which in one embodiment is part of the SDV on-board computer 301. Collision detector 317 is able to detect that the SDV 202 has been in a collision by readings from accelerometers (e.g., one or the sensors 153 shown in FIG. 1), microphones (also one of the sensors 153 shown in FIG. 1), or other sensor readings that are indicative of a collision with another vehicle, a biological entity, or a fixed object. In one embodiment, the collision detector will control the operation of and/or respond to the deployment of an airbag 319, also known as a supplemental restraint device, that quickly inflates in response to the SDV 202 being involved in a collision.

In one or more embodiments of the present invention, also within SDV 202 is a cabin camera 321, which is able to capture still or moving images of persons within the cabin of the SDV 202.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301.

In one or more embodiments of the present invention, also within the SDV 202 is a radio frequency identifier (RFID) sensor 327, which is able to detect an RFID chip (or alternatively any type of electronic sensor that is able to be interrogated for its identity). For example, assume that a driver's license is embedded with an RFID chip (or alternatively a magnetic strip) that can be interrogated by a signal from the RFID sensor 327. If the driver of the SDV 202 does not have his/her driver's license with him/her, then the RFID sensor 327 will report this condition to the SDV on-board computer 301. Alternatively, the SDV on-board computer 301 can communicate (using transceiver 323) with a remote database of drivers' licenses. If the SDV 202 is associated with specific drivers (e.g., drivers that are authorized to drive the SDV 202) and none of these specific drivers are in the remote database of drivers' licenses, then the SDV on-board computer 301 will know that the driver is not allowed to take manual control of the SDV 202.

Returning to FIG. 2, one or more embodiments of the present invention are directed to determining whether to place the SDV 202 into manual or autonomous mode, based on the qualifications/abilities/condition of the driver. In one or more embodiments, this decision is also based on roadway conditions and/or vehicle conditions, as well as other factors.

Other factors include the driving ability of the driver of the SDV 202, the accuracy of environmental and other sensors (e.g., sensors 153 shown in FIG. 1) mounted on the SDV 202, and/or learned traffic patterns for SDVs on the roadway 206.

Figure 4:
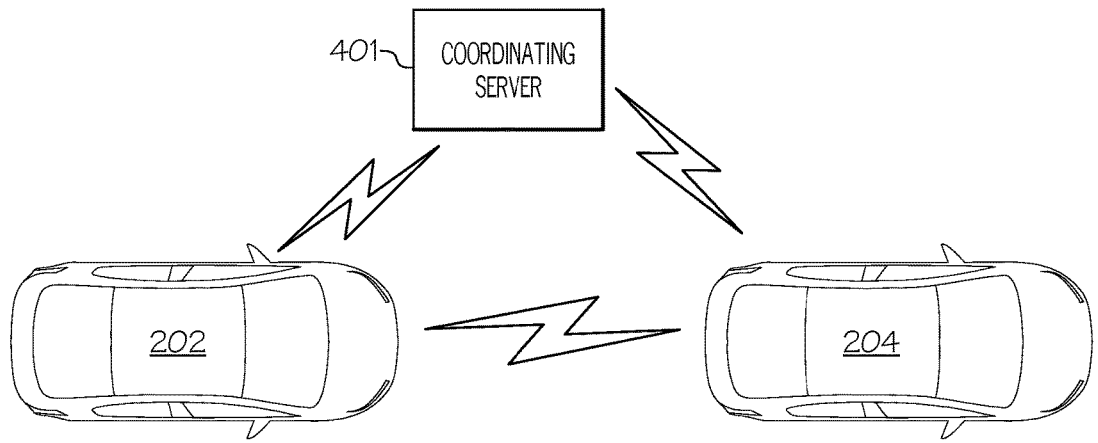
FIG. 4 depicts communication linkages among SDVs and a coordinating server.

Messages describing these factors to be used by the SDV 202 may come from the SDV 202 itself, another SDV (e.g., SDV 204), the coordinating computer 201, and/or the coordinating server 401 shown in FIG. 4. Coordinating server 401 may coordinate the control of the driving mode (i.e., autonomous or manual) of the SDVs 202/204, and/or may receive current roadway conditions of roadway 206 and/or the state of the driver of SDV 202. As depicted in FIG. 4, coordinating server 401 and/or SDV 202 and/or SDV 204 are able to communicate with one another wirelessly, using a wireless transceiver (e.g., transceiver 123 shown in FIG. 1) that is found in each of the coordinating server 401 and/or SDV 202 and/or SDV 204.

Figure 5:
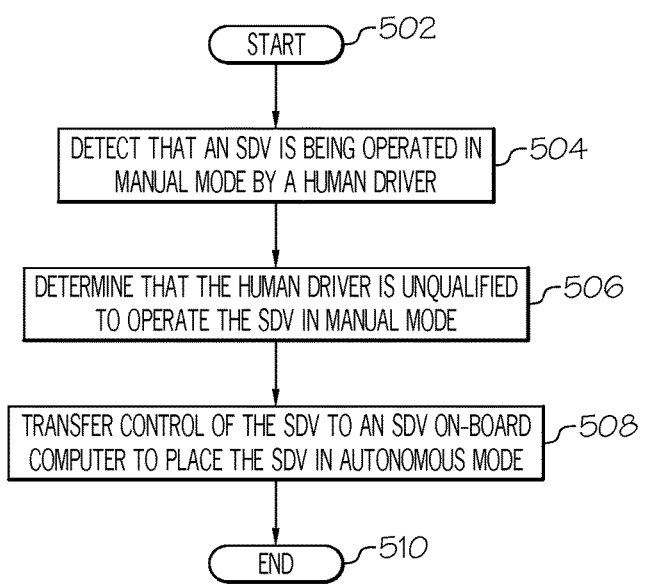
FIG. 5 is a high-level flow chart of one or more steps performed by one or more processors to control a driving mode of an SDV in accordance with one or more embodiments of the present invention.

With reference now to FIG. 5, a high-level flow chart of one or more steps performed by one or more processors to control a driving mode of an SDV in accordance with one or more embodiments of the present invention is presented. Note that various actions described for the present invention may be performed by the SDV on-board computer 301 shown in FIG. 3, the monitoring computer 401 shown in FIG. 4, and/or the cloud computing environment 50 shown in FIG. 7.

After initiator block 502, one or more processors (e.g., within the SDV on-board computer 301 shown in FIG. 1) detect that an SDV (e.g., SDV 202) is being operated in manual mode by a human driver, as depicted in block 504.

As described in block 506, the processor(s) determine that the human driver is unqualified to operate the SDV in manual mode. This determination is made based on various factors, events, systems, etc. in various embodiments of the present invention.

For example, in one embodiment of the present invention, if the human driver receives a telecommunication message (e.g., a phone call, a text message, etc. on a smart phone), then the system (e.g., SDV on-board computer 301) assumes that the driver will no longer be qualified to control the SDV, since his/her attention will be distracted by the incoming telecommunication message, and control is automatically transferred to the SDV on-board computer 301, thus placing the SDV in autonomous mode. Thus, in one embodiment of the present invention, one or more processors (e.g., within SDV on-board computer 301) detect a telecommunication device (e.g., telecommunication device 325) within the SDV is receiving a telecommunication message. In response to detecting that the telecommunication device within the SDV is receiving the telecommunication message, the processors(s) determine that the human driver is unqualified to operate the SDV in manual mode based on the telecommunication device receiving the telecommunication message. That is, in this embodiment, the processors(s) determine that the human driver is unqualified to operate the SDV in manual mode based only on the telecommunication device receiving the telecommunication message In another embodiment of the present invention, however, determination of whether or not the driver will be distracted to the point of being unqualified (e.g., incompetent) to drive the SDV is based not only on his/her smart phone receiving a telecommunication message, but also based on the content of the telecommunication message. For example, the smart phone may be able to generate a tone or other signal indicating that the message needs to be responded to immediately. If this tone/signal is not generated, then the driver knows that he/she can wait until he gets to his destination to respond to the message. However, if the tone/signal is generated, then the system will place the SDV into autonomous mode, so that the driver can immediately respond to the message. Thus, in this embodiment one or more processors not only detect that a telecommunication device within the SDV is receiving a telecommunication message, but also determine a response requirement of the telecommunication message. For example, an urgent response requirement requires a response to the telecommunication message within a first predefined amount of time after receipt of the telecommunication message (e.g., within 5 minutes), and a non-urgent response requirement requires no response to the telecommunication message until after a second predefined amount of time after receive of the communication message (any time after the next hour). In response to determining that the response requirement is the urgent response requirement, then the processor(s) (e.g., within the SDV on-board computer 301) automatically place the SDV into autonomous mode.

In one embodiment of the present invention, assume that the driver of the SDV is required to wear prescription eyewear (i.e., eyeglasses, spectacles, contact lenses, etc.) when driving the SDV. If he is not wearing such eyewear (e.g., as detected by the cabin camera 321 shown in FIG. 3), then the SDV is prohibited from being placed in manual mode (in which the driver could control the SDV). Thus, in this embodiment, determining that the human driver is unqualified to operate the SDV in manual mode includes the processor(s) determining (e.g., by looking up data from a database or profile about the human driver, as identified by his/her authorization to own/operate the SDV) that the human driver is required to wear prescription eyewear. One or more processors (e.g., within SDV on-board computer 301) detect (e.g., based on images received from cabin camera 321) that the human driver is not wearing prescription eyewear. The processor(s) thus determine that the human driver is unqualified to operate the SDV in manual mode based on the human driver not wearing prescription eyewear.

For example, assume that the driver is wearing eyeglasses. Detection logic (which utilizes the output from cabin camera 321) recognizes a geometric shape that is typical of eyewear (e.g., the geometric shape of the spectacle frame, the geometric contour of contact lenses) on a face of the driver. If not such detection is made, then a conclusion is reached that the driver is not wearing prescription eyewear. The detection may utilize active shape models, probabilistic evaluations (of the likelihood that a driver is wearing/not wearing eyewear based on the perceived parameters of the image), scale/orientation/central point of the eyewear and/or facial features, etc.

In one embodiment of the present invention, assume that the SDV is driving "into the sun" (i.e., is moving in a direction towards the sun, which is currently low on the Earth's horizon). Without wearing sunglasses, there is a strong likelihood that the driver of the SDV will be unable to see the roadway and/or objects/vehicles/persons/animals within the roadway, and thus is unqualified to operate the SDV. Thus, in this embodiment determining that the human driver is unqualified to operate the SDV in manual mode include the processor(s) (e.g., within the SDV on-board computer 301) determining that the SDV is driving towards an object that is brighter than a predetermined level (e.g., headed into the sun, extremely bright artificial light, etc.). The processor(s) (e.g., within SDV on-board computer 301) detect (e.g., from images generated by the cabin camera 321 shown in FIG. 3) that the human driver is not wearing sunglasses. Based on the human driver not wearing sunglasses and the SDV driving into the sun, the SDV on-board computer 301 determines the human driver is unqualified to operate the SDV in manual mode based on the SDV driving towards the sun and the human driver not wearing sunglasses.

In one embodiment of the present invention, assume that the driver of the SDV must have a valid driver's license, either in his/her possession or at least as reflected in a database of licensed drivers. If the driver does not have a valid driver's license (on his/her person and/or as shown in a database of licensed drivers), then the driver will not be allowed to take manual control of the SDV. Thus, in one embodiment of the present invention, determining that the human driver is unqualified to operate the SDV in manual mode is achieved by the processor(s) (e.g., within the SDV on-board computer 301) detecting that the human driver currently is not in possession of a valid driver's license. In response to detecting that the human driver currently is not in possession of the valid driver's license, the processor(s) determine that the human driver is unqualified to operate the SDV in manual mode.

In one embodiment of the present invention, if the SDV is involved in an accident (e.g., as detected by the collision detector 317 shown in FIG. 3), then an assumption is made that the driver is not competent (i.e., unqualified) to control the SDV, including pulling the SDV over to the side of the road, getting out of the way of other traffic, performing evasive maneuvers to avoid hitting other vehicles/object/persons/animals, etc. As such, the SDV will automatically be placed into autonomous mode. Thus, in this embodiment determining that the human driver is unqualified to operate the SDV in manual mode includes one or more processors (e.g., within SDV on-board computer 301) detecting (e.g., based on readings from collision detector 317) that the SDV has been involved in an accident. This leads to the assumption/determination that the human driver is unqualified to operate the SDV in manual mode.

In one embodiment of the present invention, if an airbag deploys, then an assumption is made that the driver of the SDV has been seriously jarred (due to the violent movement of the deploying airbag), and thus is (at least temporarily) unable to safely control the SDV manually (i.e., is unqualified to operate the SDV in manual mode). Thus, in this embodiment of the present invention, determining that the human driver is unqualified to operate the SDV in manual mode includes one or more processors detecting (e.g., by the SDV on-board computer 301 activating the airbag 319 shown in FIG. 3 or by a signal sent from the airbag 319 upon being deployed) that an airbag in the SDV has deployed. In response to detecting that the airbag in the SDV has deployed, the processor(s) determine that the human driver is unqualified to operate the SDV in manual mode.

In one embodiment of the present invention, the determination of whether or not the human driver is qualified to control the SDV is based on his/her level of experience, particularly with regard to current roadway conditions (i.e., the speed of other vehicles on the roadway, the density of other vehicles on the roadway, ice/snow/rain on the roadway, etc.) as detected by roadway sensors 311 and other sensors/cameras/etc. disclosed herein. If the roadway conditions are beyond the driving ability of the driver, then the driver is deemed to be incompetent to control the SDV in such roadway conditions. Thus, in this embodiment, determining that the human driver is unqualified to operate the SDV in manual mode includes one or more processors (e.g., within SDV on-board computer 301) detecting (e.g., based on readings from roadway sensors 311) a current road condition for a roadway upon which the SDV is traveling. The processor(s) thus determine that the human driver is unqualified to operate the SDV in manual mode based on the current road condition being beyond an ability of the human driver to control the SDV based on a lack of experience by the human driving in the current road condition.

Returning now to FIG. 5, as depicted in block 508, in response to determining that the human driver is unqualified to operate the SDV in manual mode (according to various embodiments, including those just described), one or more processors transfer control of the SDV to an SDV on-board computer to place the SDV in autonomous mode.

The flow chart ends at terminator block 510.

In one embodiment of the present invention, the decision of whether to place the SDV in manual or autonomous mode is based on the current driver of the SDV being part of a cohort of drivers that share certain traits. That is, in one embodiment of the present invention assume that the SDV is traveling on a roadway (e.g., roadway 206 shown in FIG. 2). One or more processors (e.g., within coordinating computer 401 shown in FIG. 4) retrieve driver profile information about the human driver of the SDV, and then assign the human driver of the SDV to a cohort of drivers traveling on the roadway in multiple SDVs (where the human driver of the SDV shares more than a predetermined quantity of traits with members of the cohort of drivers). The processor(s) retrieve traffic pattern data for the multiple SDVs occupied by the cohort of drivers traveling on the roadway, and examine that traffic pattern data to determine a first traffic flow of the multiple SDVs occupied by members of the cohort of drivers (where the multiple SDVs in the first traffic flow are operating in the autonomous mode on the roadway) and a second traffic flow of the multiple SDVs occupied by members of the cohort of drivers (where the multiple SDVs in the second traffic flow are operating in the manual mode on the roadway). In response to determining that the first traffic flow has a lower accident rate than the second traffic flow, the processor(s) prohibiting the SDV from operating in the manual mode.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents that is greater than that of on-board SDV control processors. Thus, if a particular driver matches up with the features found in members of this cohort, an assumption is made that this particular driver too is not as skilled as the on-board SDV control processor. As such, the control of the SDV is required to stay in autonomous mode, and is prohibited from switching to manual mode.

In one embodiment of the present invention, the human driver competence level of the human driver is history-based. That is, a record is reviewed on how effectively this driver has controlled the current SDV 202 or similar types of SDVs on roadways having similar environmental (traffic, weather, etc.) conditions as the current roadway 206. This effectiveness may be based on past 1) accident frequency, 2) travel speed, 3) stopping and starting, 4) gas mileage, etc. That is, the human driver competence level of the human driver describes how well the current driver has controlled this or similar SDVs in terms of safety, cost, consistency, etc. in the past.

In one embodiment of the present invention, the human driver competence level of the human driver is based on an analysis of capability of this human driver based on his traits/profile. That is, a review of this human driver's traits can lead to a conclusion regarding the strengths and weaknesses of this driver. For example, if this human driver has a record of poor night vision (as evidenced by a restriction on his/her license preventing him from driving at night), then the competence level of this driver to control a vehicle at night is low.

In one embodiment of the present invention, the decision on whether to place the SDV in manual or autonomous mode is further based on the current condition of the roadway, regardless of the driving ability of the human driver. Thus, assume again that the SDV is traveling on a roadway (e.g., roadway 206 shown in FIG. 4). One or more processors (e.g., within SDV on-board computer 301) receive sensor readings from multiple sensors (e.g., roadway sensor(s) 208 shown in FIG. 2), where each of the multiple sensors detects a different type of current condition of the roadway. The processor(s) weight each of the sensor readings for different current conditions of the roadway (e.g., snow on the roadway is weighted higher than rain on the roadway, but less than ice on the roadway). The processor(s) sum the weighted sensor readings for the different current conditions of the roadway, and determine whether the summed weighted sensor readings exceed a predefined level (e.g., some particular numerical value). In response to determining that the summed weighted sensor readings exceed a predefined level, the on-board SDV control processor prohibits the SDV from operating in the manual mode.

In one embodiment of the present invention, sensor readings are weighted and summed in order to determine whether or not an SDV should be required to operate in autonomous mode. Thus, one or more processors receive sensor readings from multiple sensors, where each of the multiple sensors detects a different type of current condition of the roadway. The processor(s) weight each of the sensor readings for different current conditions of the roadway, and then sum the weighted sensor readings for the different current conditions of the roadway. The processor(s) determine whether the summed weighted sensor readings exceed a predefined level. In response to determining that the summed weighted sensor readings do exceed a predefined level, the on-board SDV control processor prohibits the SDV from operating in the manual mode. For example, assume that a first sensor detects ice on the roadway and the second sensor detects cabin temperatures. Assume further that historical data shows that many more accidents are caused by "black ice" (ice that is not visible to the eye of the driver) than a chilly cabin of the SDV. As such, the sensor readings from sensors that detect black ice are weighted more heavily than sensor readings about cabin temperature. These weighted sensor readings are then added up. If the summed sensor reading weighted values exceed some predetermined value (which has been predetermined based on historic or engineering analyses as being a breakpoint over which the chance of accidents greatly increase), then control of the SDV must go into autonomous mode. However, if the summed sensor reading weighted values fall below this predetermined value, then control is pushed to the manual mode.

In one embodiment of the present invention, the decision to place the SDV in manual or autonomous mode is further dependent on the current mechanical condition of the SDV (e.g., the condition of the tires, the condition of the brakes, the condition of the headlights, the condition of the windshield wipers, the condition of the engine, the condition of the transmission, the condition of the cooling system, etc.). Thus, one or more processor(s) (e.g., within the SDV on-board computer 301 shown in FIG. 3) receive operational readings from one or more operational sensors (e.g., SDV equipment sensors 315 shown in FIG. 3) on the SDV, which detect a current state of mechanical equipment on the SDV. Based on the received operational readings, the processor(s) detect a mechanical fault (e.g., faulty brakes, bald tires, etc.) with the mechanical equipment on the SDV. In response to detecting the mechanical fault with the mechanical equipment on the SDV, the on-board SDV control processor prohibits the SDV from operating in the manual mode.

In one embodiment, the characteristics of the SDV cause the SDV to be placed in a cohort of similar SDVs, which have a certain operational/safety history, and thus is used to determine whether to place the SDV in manual or autonomous mode. For example, assume that SDV 202 has characteristics (e.g., make, model, size, etc.) found in other members of a cohort of SDVs. Assume that this characteristic/trait affects the SDVs ability to respond to emergency situations (such as obstacles in the road) when operating in autonomous mode. Assume further that historical data shows that these cohort members (e.g., particular makes and models of SDVs) have a history of fewer accidents with obstacles on roadways when auto-control (i.e., enabling an autonomous mode of control) is activated. As such, the system will automatically engage the autonomous mode of control for such SDVs, including SDV 202.

In an embodiment of the present invention, if neither the autonomous mode nor the manual mode controls the SDV in a safe manner, then the SDV is autonomously pulled over to the side of the road and stopped. Thus, in this embodiment one or more processors set a minimum competence level threshold for the control processor competence level and the human driver competence level. The processor(s) then determine that neither the control processor competence level nor the human driver competence level meets or exceeds the minimum competence level threshold. In response to determining that neither the control processor competence level nor the human driver competence level exceeds the minimum competence level threshold, the driving mode module (e.g., driving mode module 307 in FIG. 3) directs the on-board SDV control processor to take control of the SDV and to bring the SDV to a stop.

As described above, the present invention provides a process for selectively switching from autonomous mode to manual mode. However, if such switching back and forth occurs too frequently, safety issues may arise. For example, if the driving mode module 307 in FIG. 3 switches control of the SDV 202 from the manual mode to the autonomous mode (as described herein), and then switches control of the SDV 202 back to the manual mode a few seconds later, the driver and/or SDV will likely become confused and/or ineffective.

Therefore, in one embodiment of the present invention, a predefined time limit and/or physical distance is set between switching back and forth between control modes. For example, based on historical data that describes how long the current driver (and/or drivers from a cohort of drivers that have similar traits/characteristics as the current driver) needs to recover from relinquishing control of the SDV to the autonomous controller, the predefined time limit may be one minute. Similarly, based on historical data that describes how far the current driver must travel in order to recover from relinquishing control of the SDV to the autonomous controller, the predefined physical distance may be one mile. Therefore, if the system has switched from the manual mode to the autonomous mode, then one minute must pass and/or one mile must be traversed by the SDV before control can be returned back to the driver (e.g., manual mode is re-activated).

In one embodiment of the present invention, the cognitive load required of a driver on certain roadways is considered when choosing either the autonomous mode or the manual mode. That is, a study of driver habits and roadway conditions may show that for a particular section of roadway, a driver must exercise 5 specific cognitive decisions, including 1) watching for ice that is present on the roadway, 2) watching for animals that are present on the roadway, 3) negotiating with large trucks that are present on the roadway, 4) negotiating with other vehicles that are exceeding the posted speed limit on the roadway, and 5) negotiating a series of oncoming traffic that is merging onto the roadway. The study may show that a human driver who is able to handle three of these five cognitive decisions with no problem, has a slightly increased likelihood of performing an unsafe driving act if four of the five cognitive decisions must be dealt with, and a greatly increased likelihood of having an accident if five of the five cognitive decisions must be dealt with (all as compared to letting the on-board computer autonomous control the SDV). Thus, based on the cognitive load on the driver, the system may selectively choose to let the driver control the SDV (manual mode), or may override the driver and give control of the SDV to on-board computers (autonomous mode).

In one or more embodiments of the present invention, the decision on whether or not to allow a driver to take manual control of the SDV is further determined by location factors. For example, assume that a positioning device on the SDV has determined that the driver of the SDV has spent some predetermined amount of time (e.g., 3 hours) at a location that historically has caused the driving abilities of the driver to be impaired due to excessive fatigue or other factors (e.g., a gymnasium, a restaurant, etc.). Upon determining that the SDV has been parked in front of such a facility for the more than the predetermined amount of time (e.g., three hours), the SDV on-board processor will mandate that the SDV be operated in the autonomous mode, thus disallowing manual operation of the SDV. In one or more embodiments of the present invention, this determination is unable to be "overridden" by the driver.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
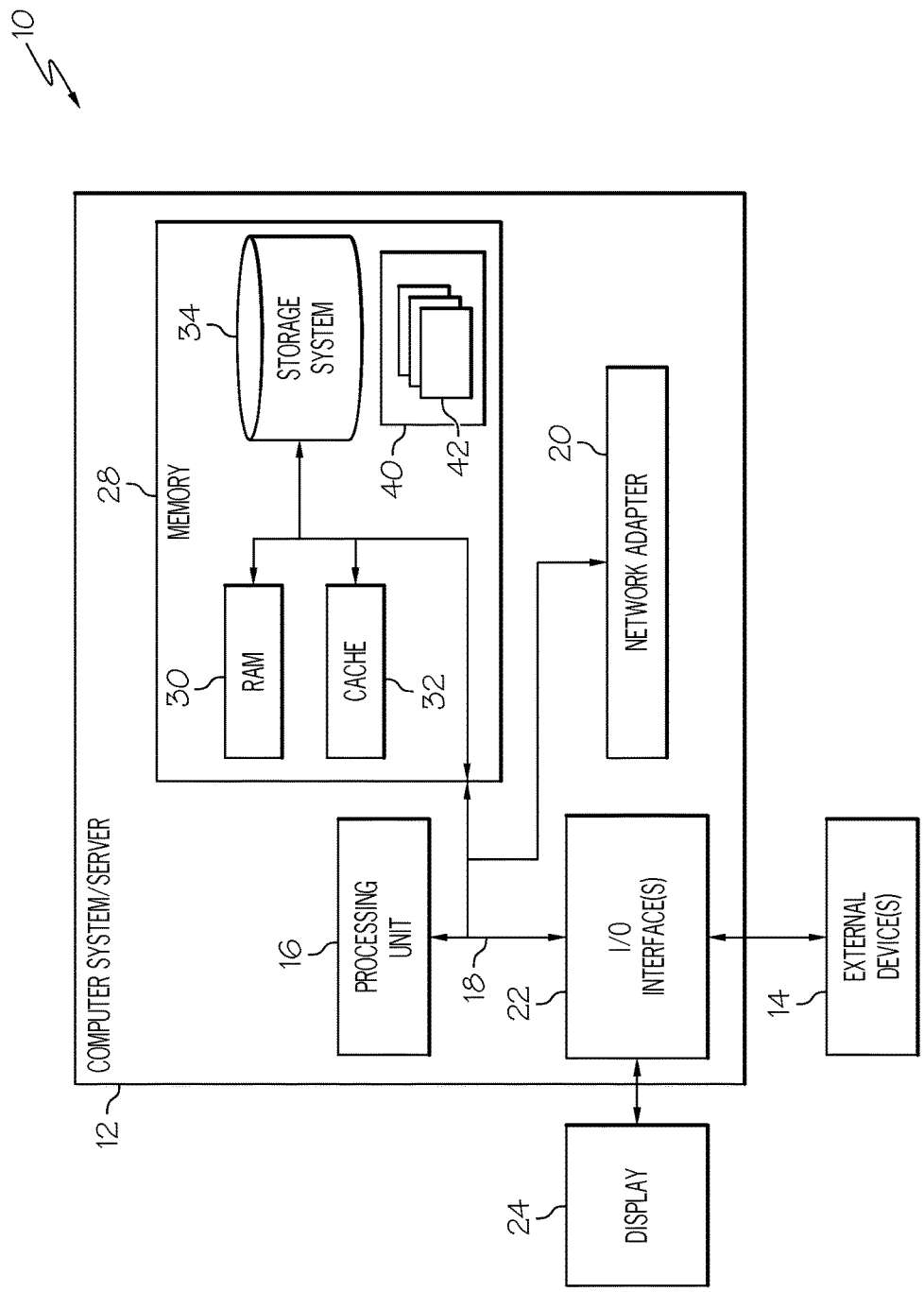
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
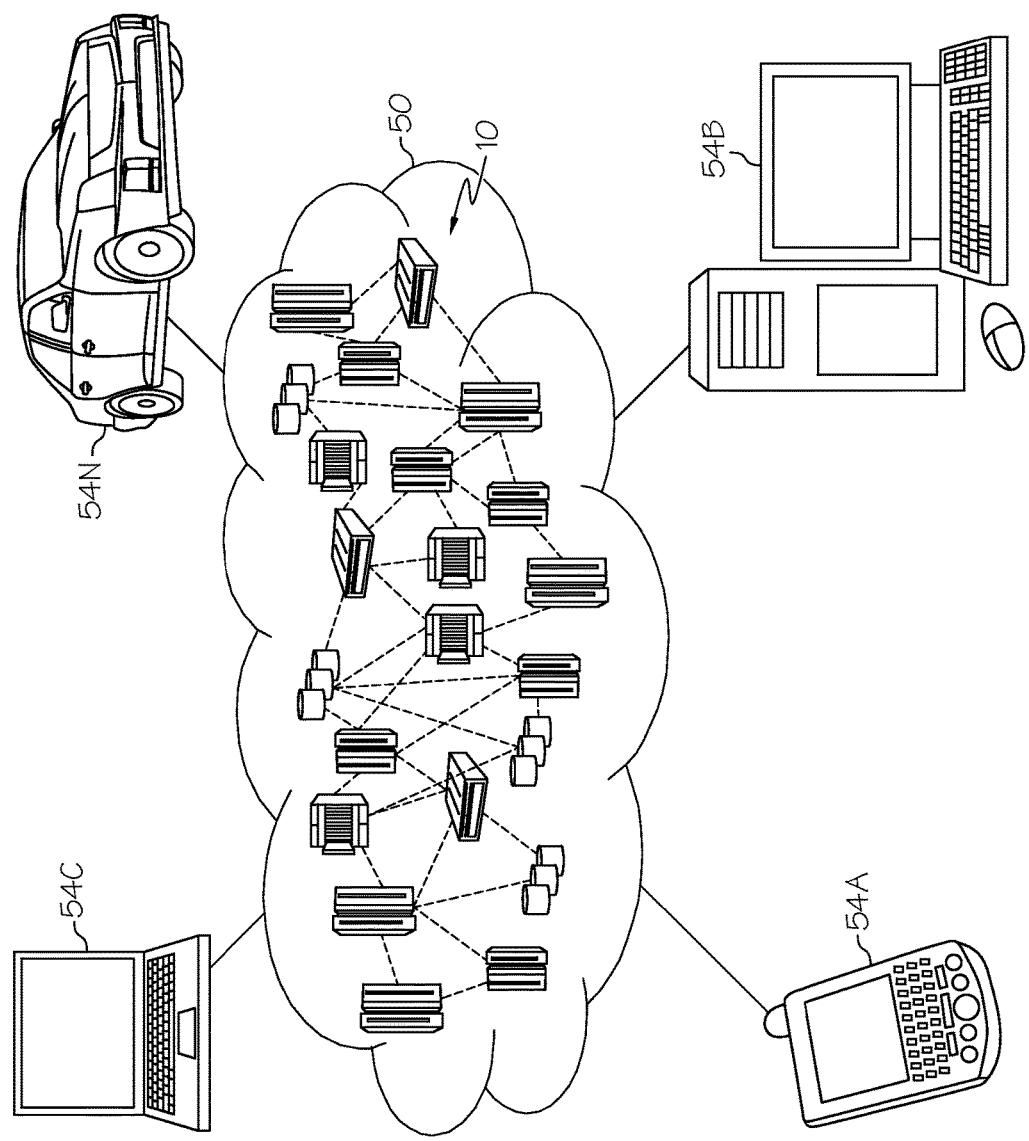
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 7 are intended to be illustrative only and that computing nodes 10 and cloud computing environment 50 can communicate with any type of computerized device over any type of network and/or network addressable connection (e.g., using a web browser).

Figure 8:
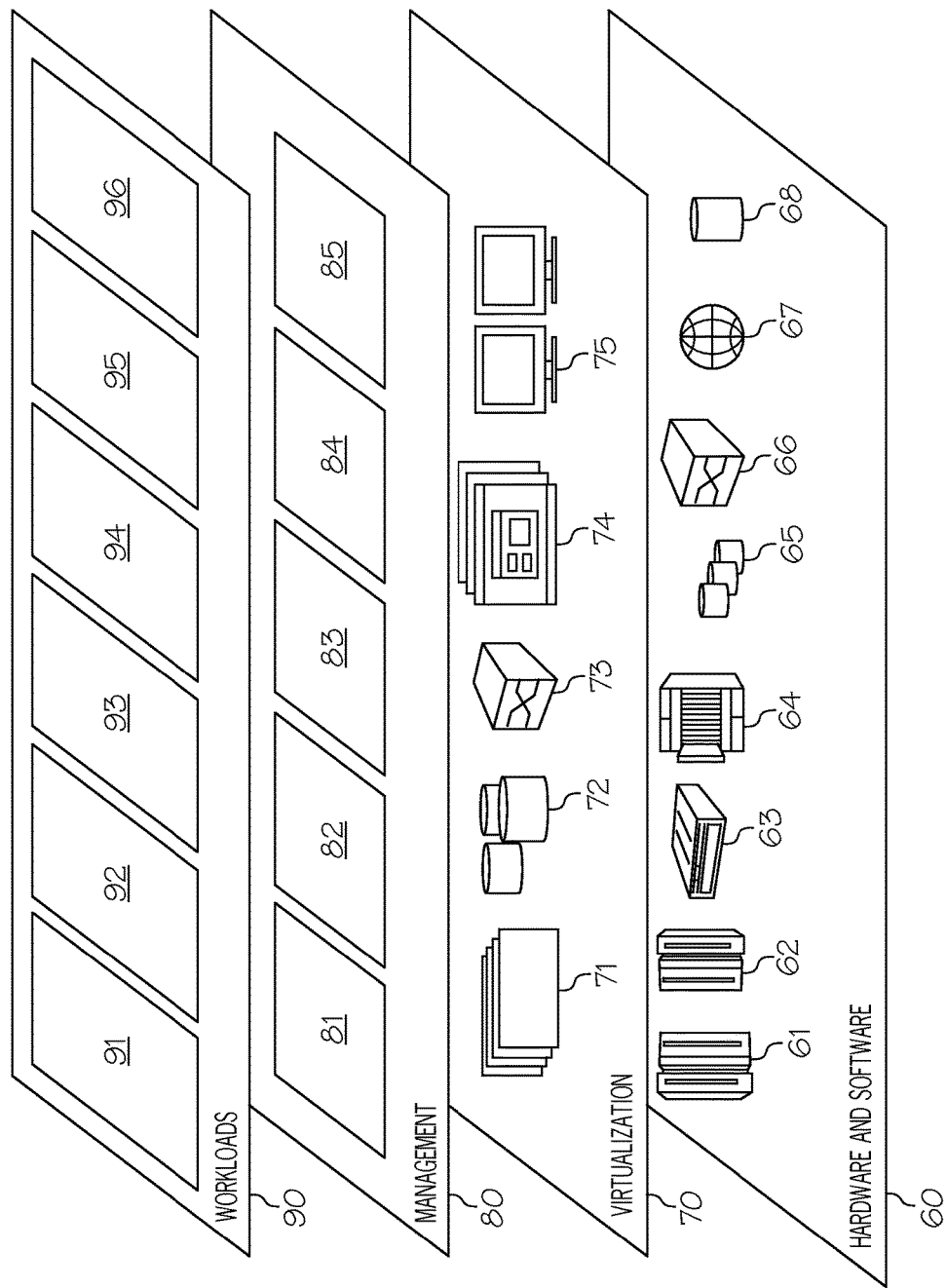
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for selectively setting control of an SDV to manual or autonomous mode as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method for controlling a driving mode of a self-driving vehicle (SDV), the processor-implemented method comprising:
   detecting, by one or more processors, that an SDV is being operated in manual mode by a human driver;
   detecting, by one or more processors within an SDV on-board computer within the SDV that monitors a telecommunication device within the SDV, that the telecommunication device within the SDV is receiving a telecommunication message;
   in response to detecting that the telecommunication device within the SDV is receiving the telecommunication message, determining, by the one or more processors, that the human driver is unqualified to operate the SDV in manual mode based on the telecommunication device receiving the telecommunication message; and
   in response to determining that the human driver is unqualified to operate the SDV in manual mode, transferring, by the one or more processors, control of the SDV to the SDV on-board computer to place the SDV in autonomous mode, wherein the SDV is in the autonomous mode when steering, braking, throttle control, and obstacle avoidance by the SDV are all controlled by the SDV on-board computer.

2. The processor-implemented method of claim 1, further comprising:
   determining, by the one or more processors, a response requirement of the telecommunication message, wherein an urgent response requirement requires a response to the telecommunication message within a first predefined amount of time after receipt of the telecommunication message, and wherein a non-urgent response requirement requires no response to the telecommunication message until after a second predefined amount of time after receipt of the telecommunication message, wherein the first predefined amount of time is shorter than the second predefined amount of time; and
   in response to determining that the response requirement is the urgent response requirement, automatically placing, by the one or more processors, the SDV into autonomous mode.

3. The processor-implemented method of claim 1, wherein said determining that the human driver is unqualified to operate the SDV in manual mode comprises:
   determining, by the one or more processors looking up data from a database about the human driver, that the human driver is required to wear prescription eyewear;
   detecting, by the one or more processors receiving images of the human driver that are received from a cabin camera that captures images of the human driver while the human driver is within a cabin of the SDV, that the human driver is not wearing prescription eyewear; and
   in response to detecting that the human driver is not wearing prescription eyewear, further determining, by the one or more processors, that the human driver is unqualified to operate the SDV in manual mode based on the human driver not wearing prescription eyewear and transferring, by the one or more processors, control of the SDV to the SDV on-board computer in order to place the SDV in the autonomous mode.

4. The processor-implemented method of claim 1, wherein said determining that the human driver is unqualified to operate the SDV in manual mode comprises:
   determining, by the one or more processors, that the SDV is driving towards an object that is brighter than a predetermined level of brightness based on data from a roadway sensor detecting a position of a sun relative to the SDV;
   detecting, by the one or more processors receiving images of the human driver that are received from a cabin camera that captures images of the human driver while the human driver is within a cabin of the SDV, that the human driver is not wearing sunglasses; and
   in response to detecting that the human driver is not wearing sunglasses while the SDV is driving towards the object that is brighter than the predetermined level of brightness, further determining, by the one or more processors, that the human driver is unqualified to operate the SDV in manual mode based on the SDV driving towards the object that is brighter than the predetermined level of brightness and the human driver not wearing sunglasses and transferring, by the one or more processors, control of the SDV to the SDV on-board computer in order to place the SDV in the autonomous mode.

5. The processor-implemented method of claim 1, wherein said determining that the human driver is unqualified to operate the SDV in manual mode comprises:
   detecting, by the one or more processors searching a database of holders of a valid driver's license, that the human driver currently is not a holder of the valid driver's license; and
   in response to detecting that the human driver currently is not the holder of the valid driver's license, further determining, by the one or more processors, that the human driver is unqualified to operate the SDV in manual mode based on the human driver not currently being the holder of the valid driver's license and transferring, by the one or more processors, control of the SDV to the SDV on-board computer in order to place the SDV in the autonomous mode.

6. The processor-implemented method of claim 1, wherein said determining that the human driver is unqualified to operate the SDV in manual mode comprises:
   detecting, by the one or more processors receiving a signal from a collision detector on the SDV, that the SDV has been involved in an accident; and in response to detecting that the SDV has been involved in the accident, further determining, by the one or more processors, that the human driver is unqualified to operate the SDV in manual mode based on the SDV being involved in the accident and transferring, by the one or more processors, control of the SDV to the SDV on-board computer in order to place the SDV in the autonomous mode.

7. The processor-implemented method of claim 1, wherein said determining that the human driver is unqualified to operate the SDV in manual mode comprises:
  detecting, by the one or more processors receiving a signal from an airbag in the SDV, that the airbag in the SDV has deployed; and
  in response to detecting that the airbag in the SDV has deployed, further determining, by the one or more processors, that the human driver is unqualified to operate the SDV in manual mode based on the airbag having deployed and transferring, by the one or more processors, control of the SDV to the SDV on-board computer in order to place the SDV in the autonomous mode.

8. The processor-implemented method of claim 1, wherein said determining that the human driver is unqualified to operate the SDV in manual mode comprises:
  detecting, by the one or more processors receiving a signal from roadway sensors on the SDV, a current roadway condition for a roadway upon which the SDV is traveling;
  further determining, by the one or more processors and based on a driving history of the human driver, that the human driver is unqualified to operate the SDV in manual mode based on the current roadway condition being beyond an ability of the human driver to control the SDV based on a lack of experience by the human driver in driving in the current roadway condition; and
  transferring, by the one or more processors, control of the SDV to the SDV on-board computer in order to place the SDV in the autonomous mode.

9. The processor-implemented method of claim 1, wherein the SDV is traveling on a roadway, and wherein the processor-implemented method further comprises:
  retrieving, by the one or more processors, driver profile information about the human driver of the SDV;
  assigning, by the one or more processors and based on a predetermined quantity of traits shared by the human driver with members of a cohort of drivers traveling on the roadway in multiple SDVs, the human driver of the SDV to the cohort of drivers traveling on the roadway in multiple SDVs, wherein the human driver of the SDV shares more than the predetermined quantity of traits with members of the cohort of drivers;
  retrieving, by the one or more processors, traffic pattern data for the multiple SDVs occupied by the cohort of drivers traveling on the roadway;
  examining, by the one or more processors, the traffic pattern data to determine a first traffic flow of the multiple SDVs occupied by members of the cohort of drivers, wherein the multiple SDVs in the first traffic flow are operating in the autonomous mode on the roadway;
  examining, by the one or more processors, the traffic pattern data to determine a second traffic flow of the multiple SDVs occupied by members of the cohort of drivers, wherein the multiple SDVs in the second traffic flow are operating in manual mode on the roadway; and
  in response to determining that the first traffic flow has a lower accident rate than the second traffic flow, prohibiting, by the one or more processors, the SDV from operating in manual mode.

10. The processor-implemented method of claim 1, wherein the SDV is traveling on a roadway, and wherein the processor-implemented method further comprises:
  receiving, by the one or more processors, sensor readings from multiple sensors, wherein each of the multiple sensors detects a different type of current condition of the roadway;
  weighting, by the one or more processors, each of the sensor readings for different current conditions of the roadway;
  summing, by the one or more processors, weighted sensor readings for the different current conditions of the roadway;
  determining, by the one or more processors, whether the summed weighted sensor readings exceed a predefined level; and
  in response to determining that the summed weighted sensor readings exceed a predefined level, prohibiting, by the one or more processors, the SDV from operating in manual mode.

11. The processor-implemented method of claim 1, further comprising:
  receiving, by the one or more processors, operational readings from one or more operational sensors on the SDV, wherein the operational sensors detect a current state of mechanical equipment on the SDV;
  detecting, by the one or more processors and based on received operational readings, a mechanical fault with the mechanical equipment on the SDV; and
  in response to detecting the mechanical fault with the mechanical equipment on the SDV, prohibiting, by the one or more processors, the SDV from operating in manual mode and transferring autonomous control of the SDV to the SDV on-board computer.

12. A computer program product for controlling a driving mode of a self-driving vehicle (SDV), the computer program product comprising a non-transitory computer readable storage medium having program code embodied therewith, the program code readable and executable by a processor to perform a method comprising:
  detecting that an SDV is being operated in manual mode by a human driver;
  detecting that a telecommunication device within the SDV is receiving a telecommunication message;
  in response to detecting that the telecommunication device within the SDV is receiving the telecommunication message, determining that the human driver is unqualified to operate the SDV in manual mode based on the telecommunication device receiving the telecommunication message; and
  in response to determining that the human driver is unqualified to operate the SDV in manual mode, transferring control of the SDV to an SDV on-board computer to place the SDV in autonomous mode, wherein the SDV is in the autonomous mode when steering, braking, throttle control, and obstacle avoidance by the SDV are all controlled by the SDV on-board computer.

13. The computer program product of claim 12, wherein the method further comprises:
  determining a response requirement of the telecommunication message, wherein an urgent response requirement requires a response to the telecommunication message within a first predefined amount of time after receipt of the telecommunication message, and wherein a non-urgent response requirement requires no response to the telecommunication message until after a second predefined amount of time after receipt of the telecommunication message, wherein the first predefined amount of time is shorter than the second predefined amount of time; and in response to determining that the response requirement is the urgent response requirement, automatically placing the SDV into autonomous mode.

14. The computer program product of claim 12, wherein said determining that the human driver is unqualified to operate the SDV in manual mode comprises:

determining that the human driver is required to wear prescription eyewear by looking up data from a database about the human driver;

detecting that the human driver is not wearing prescription eyewear by receiving images of the human driver that are received from a cabin camera that captures the images of the human driver while the human driver is within a cabin of the SDV; and in response to detecting that the human driver is not wearing prescription eyewear, further determining that the human driver is unqualified to operate the SDV in manual mode based on the human driver not wearing prescription eyewear.

15. The computer program product of claim 12, wherein said determining that the human driver is unqualified to operate the SDV in manual mode comprises:

detecting that an airbag in the SDV has deployed; and in response to detecting that the airbag in the SDV has deployed, further determining that the human driver is unqualified to operate the SDV in manual mode based on the airbag having deployed.

16. The computer program product of claim 12, wherein the SDV is traveling on a roadway, and wherein the method further comprises:

retrieving driver profile information about the human driver of the SDV;

assigning the human driver of the SDV to a cohort of drivers traveling on the roadway in multiple SDVs, wherein the human driver of the SDV shares more than a predetermined quantity of traits with members of the cohort of drivers;

retrieving traffic pattern data for the multiple SDVs occupied by the cohort of drivers traveling on the roadway;

examining the traffic pattern data to determine a first traffic flow of the multiple SDVs occupied by members of the cohort of drivers, wherein the multiple SDVs in the first traffic flow are operating in the autonomous mode on the roadway;

examining the traffic pattern data to determine a second traffic flow of the multiple SDVs occupied by members of the cohort of drivers, wherein the multiple SDVs in the second traffic flow are operating in manual mode on the roadway; and in response to determining that the first traffic flow has a lower accident rate than the second traffic flow, prohibiting the SDV from operating in manual mode.

17. The computer program product of claim 12, wherein the method further comprises:

receiving operational readings from one or more operational sensors on the SDV, wherein the operational sensors detect a current state of mechanical equipment on the SDV;

detecting, by the one or more processors and based on received operational readings, a mechanical fault with the mechanical equipment on the SDV; and in response to detecting the mechanical fault with the mechanical equipment on the SDV, prohibiting, by the on-board SDV control processor, the SDV from operating in manual mode.

18. A computer system comprising:

a processor, a non-transitory computer readable memory, and a non-transitory computer readable storage medium;

first program instructions to detect that an SDV is being operated in manual mode by a human driver;

second program instructions to detect, based upon receipt of a signal from a collision detector on the SDV, that the SDV has been involved in an accident;

third program instructions to, in response to detecting that the SDV has been involved in the accident, determine that the human driver is unqualified to operate the SDV in manual mode based on the SDV being involved in the accident; and fourth program instructions to, in response to determining that the human driver is unqualified to operate the SDV in manual mode, transfer control of the SDV to an SDV on-board computer to place the SDV in autonomous mode, wherein the SDV is in the autonomous mode when steering, braking, throttle control, and obstacle avoidance by the SDV are all controlled by the SDV on-board computer;

and wherein the first, second, third, and fourth program instructions are stored on the non-transitory computer readable storage medium for execution by one or more processors via the non-transitory computer readable memory.

* * * * *